(12) United States Patent
Li et al.

(10) Patent No.: US 9,034,516 B2
(45) Date of Patent: May 19, 2015

(54) MATERIALS PREPARED BY METAL EXTRACTION

(71) Applicant: Wildcat Discovery Technologies, Inc., San Diego, CA (US)

(72) Inventors: Bin Li, San Diego, CA (US); Wei Tong, San Diego, CA (US); Jen Hsien Yang, San Diego, CA (US)

(73) Assignees: Wildcat Discovery Technologies, Inc., San Diego, CA (US); Tianjin B&M Science and Technology Joint-Stock Co., Ltd., Tianjin (CN)

( * ) Notice: Subject to any disclaimer, the term of this patent is extended or adjusted under 35 U.S.C. 154(b) by 0 days.

(21) Appl. No.: 14/253,764

(22) Filed: Apr. 15, 2014

(65) Prior Publication Data

US 2014/0302388 A1   Oct. 9, 2014

Related U.S. Application Data

(63) Continuation-in-part of application No. 13/831,933, filed on Mar. 15, 2013.

(60) Provisional application No. 61/676,942, filed on Jul. 28, 2012.

(51) Int. Cl.

| | | |
|---|---|---|
| H01M 2/02 | (2006.01) | |
| H01M 4/505 | (2010.01) | |
| H01M 4/525 | (2010.01) | |
| H01M 6/00 | (2006.01) | |
| H01M 4/04 | (2006.01) | |
| H01M 4/485 | (2010.01) | |

(52) U.S. Cl.
CPC .............. *H01M 4/505* (2013.01); *H01M 4/525* (2013.01); *H01M 6/005* (2013.01); *Y10T 29/49108* (2015.01); *Y02E 60/122* (2013.01); *H01M 4/04* (2013.01); *H01M 4/485* (2013.01)

(58) Field of Classification Search
None
See application file for complete search history.

(56) References Cited

U.S. PATENT DOCUMENTS

| | | | |
|---|---|---|---|
| 5,916,516 A | 6/1999 | Kolb | |
| 6,703,166 B1 * | 3/2004 | Sheem et al. | 429/231.8 |
| 2008/0131777 A1 * | 6/2008 | Hatta et al. | 429/219 |
| 2009/0087362 A1 | 4/2009 | Sun et al. | |

(Continued)

FOREIGN PATENT DOCUMENTS

WO    2011054441 A    5/2011

OTHER PUBLICATIONS

Sun et al., Improvement of structural and electrochemical properties of AlF3-coated Li[Ni1/3Co1/3Mn1/3]O2 cathode materials on high voltage region, Journal of Power Sources, 178 (2008) 826-831.*

(Continued)

*Primary Examiner* — Patrick Ryan
*Assistant Examiner* — Jose Colucci Rios
(74) *Attorney, Agent, or Firm* — Corridor Law Group, P.C.

(57) ABSTRACT

A method for extracting ions from an active material for use in a battery electrode includes mixing the active material and an activating compound to form a mixture. The mixture is annealed such that an amount of ions is extracted from the active material, an amount of oxygen is liberated from the active material, and an activated active material is formed. Embodiments of the invention include the activated active material, the electrode, and the primary and secondary batteries formed from such activated active materials.

20 Claims, 16 Drawing Sheets

(56) References Cited

U.S. PATENT DOCUMENTS

| | | | |
|---|---|---|---|
| 2009/0194747 A1 | 8/2009 | Zou et al. | |
| 2010/0323244 A1 | 12/2010 | Chiang et al. | |
| 2012/0070725 A1* | 3/2012 | Venkatachalam et al. | 429/188 |
| 2012/0263998 A1 | 10/2012 | Thackeray et al. | |

OTHER PUBLICATIONS

Thackeray et al., Enhancing the rate capability of high capacity $xLi_2MnO_3$-(1-x)$LiMO_2$ (M=Mn, Ni, Co) electrodes by Li—Ni—PO4 treatment, Electrochemistry Communications 11 (2009) 748-751.*

Yang et al., The effects of quenching treatment and AlF3 coating on $LiNi_{0.5}Mn_{0.5}O_2$ cathode materials for lithium-ion battery, Materials Chemistry and Physics 119 (2010) 519-523.*

Arai and Sakurai, "Characteristics of $Li_xNiO_2$ obtained by chemical delithiation," Journal of Power Sources 81-82 (1999) 401-405.

Arai et al, "Nickel dioxide polymorphs as lithium insertion electrodes," Electrochimica Acta 47 (2002) 2697-2705.

International Search Report and Written Opinion Issued on Oct. 24, 2013, in connection with PCT/US2013/051597.

Ozawa and Sasaki, "An Alkali-Metal Ion Extracted Layered Compound as a Template for a Metastable Phase Synthesis in a Low-Temperature Solid-State Reaction: Preparation of Brookite from $K_{0.8}Ti_{1.73}Li_{0.27}O_4$," Inorg. Chem. 2010, 49, 3044-3050.

Ozawa and Sasaki, "Exploration of Mid-Temperature Alkali-Metal-Ion Extraction Route Using PTFE (AEP): Transformation of α-$NaFeO_2$-Type Layered Oxides into Rutile-Type Binary Oxides," Inorg. Chem. 2012, 51, 7317-7323.

Park et al., Improvement of structural and electrochemical properties of AlF3-coated $Li[Ni_{1/3}Co_{1/3}Mn_{1/3}]O_2$ cathode materialson high voltage region, Journal of Power Sources, 178 (2008) 826-831.

Sun et al, "The Role of AlF3 Coatings in Improving Electrochemical Cycling of Li-Enriched Nickel—Manganese Oxide Electrodes for Li-Ion Batteries," Adv. Mater. 2012, 24, 1192-1196.

Thackeray et al., Enhancing the rate capability of high capacity $xLi_2MnO_3$-(1-x)$LiMO_2$(M=Mn,Ni, Co) electrodes by Li—Ni—PO4 treatment, Electrochemistry Communications 11 (2009) 748-751.

Yang et al., The effects of quenching treatment and AlF3 coating on $LiNi_{0.5}Mn_{0.5}O_2$ cathodematerials for lithium-ion battery, Materials Chemistry and Physics 119 (2010) 519-523.

* cited by examiner

MATERIALS PREPARED BY METAL EXTRACTION

CROSS-REFERENCE TO RELATED APPLICATIONS

This application is a continuation-in-part of copending U.S. patent application Ser. No. 13/831,933 filed Mar. 15, 2013 entitled "Materials Prepared By Metal Extraction," which in turn claims priority to and the benefit of U.S. Provisional Application No. 61/676,942 filed Jul. 28, 2012 entitled "Cathode Materials." This application claims priority to and the benefit of the above applications, each of which is incorporated herein by reference in its entirety.

BACKGROUND OF THE INVENTION

The present invention is in the field of battery technology and, more particularly, in the area of improved active materials for use in electrodes in electrochemical cells.

Research into active materials for cathodes for secondary batteries has yielded several classes of active materials. One class of active materials is a type of "over-lithiated" layered oxide (OLO) represented as:

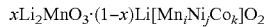

$$x\text{Li}_2\text{MnO}_3 \cdot (1-x)\text{Li}[\text{Mn}_i\text{Ni}_j\text{Co}_k]\text{O}_2$$

where $0 \leq x \leq 1$, $i+j+k=1$, and $i$ is non-zero. Such OLO materials are promising candidates for next generation batteries because of their high specific capacity.

However, OLO materials suffer from a large irreversible capacity loss during the first cycle of use in an electrochemical cell. Batteries fabricated with OLO materials are assembled using a non-activated form of the OLO material. On first cycle, the non-activated material is electrochemically activated by simultaneous extraction of lithium in the form of $\text{Li}^+$ and oxygen in the form of $\text{O}_2$ or other oxygen-containing gasses. This activation process has several drawbacks. First, gas is generated, which can lead to problems in cell manufacture. Second, defects may be generated in the surface and bulk, which can reduce rate capability, increase the rate of metal dissolution, and increase the rate of electrolyte oxidation. Third, the extracted lithium may form unstable lithium species on the anode that interfere with typical anode stabilization.

OLO has been chemically activated by reaction with aqueous acids, such as hydrochloric acid (HCl). Such an activation process has several drawbacks. First, this activation process requires an excess of acid, which can make it difficult to control the extent of lithium extraction such that an insufficient amount or excess amount of lithium is extracted. Second, water and/or protons can become incorporated into any vacancies generated by the activation and this can lead to poor cycle life and rate performance. Third, the disposal of the wastewater from this process can be costly due to the chemical contaminants in it, making the process difficult to scale up.

Some research has been conducted into the use of organo-fluorides, such as polyvinylidenefluoride (PVdF) and polytetrafluoroethylene (PTFE), to remove alkali-ions from metal oxides. In some research, the organo-fluoride was used to remove both alkali ions and oxygen. See, e.g., T. Ozawa et al., Inorg. Chem, 49, (2010) 3044 and T. Ozawa et al., Inorg. Chem, 51 (11), (2012). The reaction was used to remove all of the alkali-ion from the material.

Further, there has been some work on the use of aluminum fluoride ($\text{AlF}_3$) coatings to improve the electrochemical performance of lithium-rich layered oxides. See, e.g., Scrosati, B. et al., Adv. Mater. 2012, 24, 1192-1196 and Zheng, J. M. et al., J. Electrochem. Soc. 2008, 155 (10), A775-A782. Still further, U.S. Patent Publication 2013/0216701 discloses an $\text{AlF}_3$ coating formed from precursors including an aluminum nitrate solution and an ammonium fluoride solution. No $\text{AlF}_3$ was used directly in the coating process. There is no evidence in the publication to suggest any chemical reaction between the OLO and the metal fluorides and no evidence of unit cell changes in the OLO structure. The coating process must take place in nitrogen or other oxygen-free atmosphere. And still further, International Publication WO 2006/109930 discloses the use of elemental precursors such as metal alkoxide, sulfate, nitrate, actetate, chloride, or phosophate to coat lithium metal oxide materials.

Some research has been conducted on delithiating $\text{LiNiO}_2$ for rechargeable batteries. See, e.g., Arai, H. et al., Electrochem. Acta 2002, 47, 2697 (for use of sulfuric acid) and Arai, H. et al., J. Power Sources 1999, 81-82, 401 (for use of $\text{NOPF}_6$). In the work using $\text{NOPF}_6$, the $\text{PF}_6$ reacts with the $\text{LiNiO}_2$ and generates an $\text{LiPF}_6$ salt and NO gas. In this reaction, all the fluorine atoms remain bonded to the phosphorous. Further, the degree of delithiation was low in spite of the excess amount of $\text{NOPF}_6$ ($\text{NOPF}_6/\text{LiNiO}_2=2$).

There remains a need for an efficient, scalable means of pre-activating OLO active materials through controlled lithium extraction for the fabrication of full cells for use as primary and secondary batteries.

BRIEF SUMMARY OF THE INVENTION

According to some embodiments of the invention, a method for reducing the irreversible capacity loss of lithium-rich layered oxide materials is presented herein.

According to some embodiments of the invention, a method for extracting ions from an active material for use in a battery electrode includes mixing the active material and an activating compound to form a mixture. The mixture is annealed such that an amount of ions is extracted from the active material, an amount of oxygen is liberated from the active material, and an activated active material is formed. The reaction products are optionally separated from the activated active material and the battery electrode is formed. Embodiments of the invention include the activated active material, the electrode, and the primary and secondary batteries formed from such activated active materials.

According to some embodiments of the invention, a method of activating a lithium oxide material, such as a lithium transition metal oxide material, for use in a battery electrode includes mixing the lithium oxide material and an amount of activating compound to form a mixture. The mixture is annealed such that a controlled amount of lithium is extracted by preselecting the amount of activating material in the mixture. A non-gaseous oxygen reaction product may be formed.

According to some embodiments of the invention, a method of extracting alkali ions from a material includes mixing the material and an amount of activating compound to form a mixture wherein the activating compound is a non-fluorinated organo-halide. The mixture is annealed such that a controlled amount of alkali ions is extracted from the active material. The amount is controlled by preselecting the amount of activating material in the mixture. A non-gaseous oxygen reaction product may be formed.

DETAILED DESCRIPTION OF THE INVENTION

Figure 1:
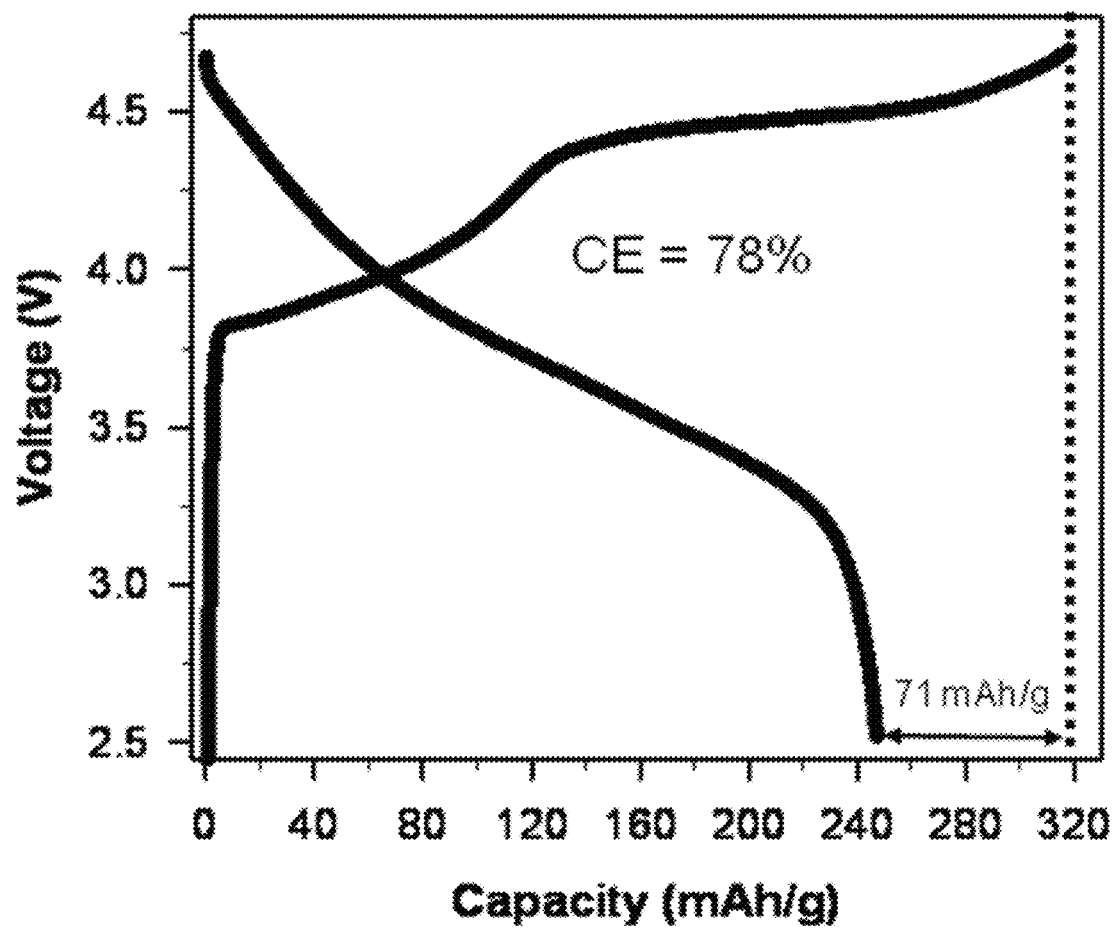
FIG. 1 illustrates a voltage trace for a conventional OLO material and depicts the irreversible capacity loss after the first cycle.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

The term "halogen" refers to any of the chemical elements in group 17 of the periodic table, including fluorine (F), chlorine (Cl), bromine (Br), iodine (I), and astatine (At).

The term "chalcogen" refers to any of chemical elements in group 16 of the periodic table, including oxygen (O), sulfur (S), selenium (Se), tellurium (Te), and polonium (Po).

The term "alkali metal" refers to any of the chemical elements in group 1 of the periodic table, including lithium (Li), sodium (Na), potassium (K), rubidium (Rb), cesium (Cs), and francium (Fr).

The term "alkaline earth metals" refers to any of the chemical elements in group 2 of the periodic table, including beryllium (Be), magnesium (Mg), calcium (Ca), strontium (Sr), barium (Ba), and radium (Ra).

The term "rare earth element" refers to scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

The term "poor metal" refers to the elements aluminum (Al), gallium (Ga), indium (In), thallium (Tl), tin (Sn), lead (Pb), bismuth (Bi) and polonium (Po).

The term "metalloid" refers to a chemical element with properties that are in-between or a mixture of those of metals and nonmetals, including boron (B), silicon (Si), germanium (Ge), arsenic (As), antimony (Sb), tellurium (Te), carbon (C), aluminum (Al), selenium (Se), polonium (Po), and astatine (At).

The term "metals" includes metalloids, poor metals, alkaline earth metals, alkali metals, and transition metals as each of those terms is defined herein.

The term "organic moiety" refers to carbon-containing chemical compounds, as the term "organic" is widely understood in the chemical arts.

The term "specific capacity" refers to the amount (e.g., total or maximum amount) of electrons or lithium ions a material is able to hold (or discharge) per unit mass and can be expressed in units of mAh/g. In certain aspects and embodiments, specific capacity can be measured in a constant current discharge (or charge) analysis, which includes discharge (or charge) at a defined rate over a defined voltage range against a defined counterelectrode. For example, specific capacity can be measured upon discharge at a rate of about 0.05 C (e.g., about 12.5 mA/g) from 4.8 V to 2.0 V versus a Li/Li+ counterelectrode. Other discharge rates and other voltage ranges also can be used, such as a rate of about 0.1 C (e.g., about 25 mA/g), or about 0.5 C (e.g., about 125 mA/g), or about 1.0 C (e.g., about 250 mA/g).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

The term "NMC" refers to materials of Formulas (I) or (II) in which nickel, manganese, and cobalt are present. Formula (II) depicts lithium-rich NMC materials, also referred to herein at "OLO" materials.

To the extent certain battery characteristics can vary with temperature, such characteristics are specified at room temperature (about 30 degrees C.), unless the context clearly dictates otherwise.

Ranges presented herein are inclusive of their endpoints. Thus, for example, the range 1 to 3 includes the values 1 and 3 as well as intermediate values.

The terms "milling" and "mixing" are used interchangeably, except in the instances where low energy mixing processes are specified. In such instances, the materials were predominantly mixed rather than milled.

A component of the OLO active material can be represented as:

  (I)

where $0.9 \leq a+b+c+d \leq 1.1$ and b is non-zero. In its activated form, the material represented by Formula (I) has a lithium ion vacancy such that it can be represented as:

  (II)

where $0.9 \leq a+b+c+d \leq 1.1$, b is non-zero, $0.1 \leq y \leq 1.1$, and $0 \leq x < 2$. The loss of a lithium ion creates a vacancy and it is this vacancy in the active material represented by Formula (II) that facilitates lithium ion transfer in an electrochemical cell.

According to certain embodiments of the invention, the active material represented by Formula (II) advantageously can be formed prior to assembly of the electrochemical cell, thereby avoiding significant irreversible capacity losses during the first cycle of use of the electrochemical cell. In such embodiments, formation of the active material represented by Formula (II) occurs via the following generalized reaction:

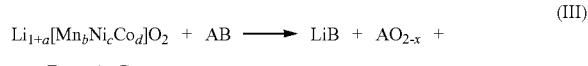 (III)

Formula (I)

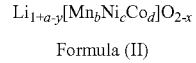

Formula (II)

where A is an organic moiety or a metal; B is a halogen or a chalcogen; $0 \leq x < 2$; a, b, c, d, & y retain the values defined for them in Formulas (I) and (II). The "AB-type" materials of Formula (III) can be referred to as activating compounds when used according to embodiments of the invention. The reaction can extract both an alkali metal, such as lithium, and an anion, such as an oxygen ion.

In embodiments of the invention, lithium oxide materials react with the AB compound such that the lithium reacts with the halogen or chalcogen. In some embodiments, a binary alkali halide salt or a binary alkali chalcogenide salt is formed, and the formation of these salts provides the thermodynamic driving force for substantial chemical delithiation.

More generally, embodiments of the invention relate to metal extraction from ceramic materials by high temperature reaction with an organo-halide or organo-chalcogenide. In such reactions, the halide or chalcogenide component reacts with the ceramic to form a metal-halide or metal-chalcogenide compound or complex. In this manner, the organo-halide or organo-chalcogenide extracts metal from the ceramic. Preferably, the metal is an alkali metal or an alkaline-earth metal.

One of the advantages of the reaction of Formula (III) is that any oxygen liberated during the reaction is easily removed from the system prior to fabrication of the cathode. Another advantage of the reaction of Formula (III) is that the extraction of lithium from the material represented by Formula (I) can be stoichiometric. Control over the reaction is exercised by preselecting the amount of activating compound. In contrast, certain known methods of extracting lithium from the material represented by Formula (I) rely on the first cycle of an assembled cell to extract lithium. Such prior art methods of lithium extraction can release oxygen, which is problematic in an assembled cell, and do not allow for stoichiometric control of the lithium extraction.

Another advantage of certain embodiments is that by pre-activating the active material of the cathode, the cathode is effectively chemically charged rather than electrochemically charged. Using a chemically charged or activated material, such as the material represented by Formula (II), it is possible to fabricate a primary battery from these high energy density OLO materials or similar materials. In contrast, conventional OLO materials are presently used only in secondary batteries where they can be electrochemically activated during a charge/discharge cycle. Thus, embodiments of the invention could be used for activation of battery materials, including full removal of alkali or alkaline-earth metal ions from a cathode material, to enable such a cathode material to be used in a primary battery.

For example, in the case of a lithium nickel oxide cathode material chemically activated using PVdF, at least two different reactions are possible:

 (IV)

or

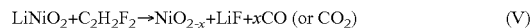 (V)

Formula (V) illustrates the case where oxygen is liberated and reacts with the carbon of the PVdF. Other reaction products, including, but not limited to, CO, $CO_2$, $H_2O$, $CO_2F$, C, and/or $C_xH_y$, may be formed.

According to embodiments of the invention, the irreversible capacity loss in OLO materials is reduced by pre-activating OLO materials via the reaction represented by Formula (III). Organo-halides, organo-chalcogenides, and metal halides are preferred materials for facilitating this chemical activation of OLO materials. According to certain embodiments, the activation process uses conventional materials for the formation of cathode materials based on lithium-rich layered oxides, such as $Li_2CO_3$, LiOH, $Ni(OH)_2$, NiO, NiOOH, $NiCO_3$, $MnO_2$, $Mn_2O_3$, $MnCO_3$, CoO, $Co_2O_3$, and $Co(OH)_2$, as well as various nitrates, sulfates, halides, and acetates for Li, Ni, Mn, and Co. These starting materials are milled using conventional milling processes or mixing processes with activating compounds represented in Formula (III), such as organo-halides, organo-chalcogenides, metal halides, or combinations thereof. This milled mixture is then annealed.

In embodiments of Formula (III) in which A is a metal, the metal is preferably an alkali or alkaline-earth metal. In some embodiments of Formula (III) in which A is a metal, the metal may be a transition metal. In some embodiments of Formula (III) in which A is a metal, the metal may be an element from group 13, 14 or 15 of the periodic table or a rare earth element.

In embodiments of Formula (III) in which A is an organic moiety, the organic moiety preferably contains a functional group that forms stable complexes with alkali or alkaline earth metals. Examples of preferable classes of organic moieties include fluoro-polymers, chloro-polymers, carbon-halides, alkyl fluorides, aryl fluorides, and combinations thereof. Examples of preferable fluoro-polymers include PVdF and PTFE. Examples of preferable chloro-polymers include polyvinylchloride (PVC). Examples of preferable carbon-halides include carbon monofluoride (CFx). Examples of preferable aryl fluorides include octafluoronapthalene.

In some embodiments of Formula (III) in which B is a halogen, the halogen is not fluorine. In such embodiments, preferably the AB material of Formula (III) is an organo-halide based on chlorine, such as polyvinyl chloride (PVC). PVC is a comparatively low-cost organo-halide and would allow the activation process to be scaled up efficiently.

In some embodiments of Formula (III) in which B is a chalcogen, the AB compound is preferably cadmium telluride, indium sulfide, zinc telluride, or sodium selenide.

Without being bound to any particular theory or mode of action, the annealing process may promote reaction of the "B" materials with the lithium contained in the cathode starting materials. For example, the high temperature may promote fluorine reaction with the lithium contained in a layered oxide material. Further, the "A" materials may react with any oxygen liberated in this process. For example, an organic "A" material such as carbon can react with liberated oxygen to form $CO_N$. Such a process results in an OLO material that has some amount of lithium pre-discharged or extracted, and provides an improvement in the observed irreversible capacity loss during first cycle.

According to certain embodiments, the milling is accomplished via a conventional milling process, such as ball-milling or other substantially equivalent milling processes.

In certain embodiments, low energy mixing processes are preferable for materials where the low energy milling process preserves the morphology of the particles. Milling can deform particles and certain ceramics or cathode materials from which the metal is extracted benefit from a low energy mixing process.

According to certain embodiments, the milled or mixed mixture is annealed at a relatively high temperature for a sufficient time. A suitable temperature range may be from about 150 degrees C. to about 800 degrees C., from about 200 degrees C. to about 800 degrees C., from about 250 degrees C. to about 800 degrees C., from about 300 degrees C. to about 800 degrees C., from about 350 degrees C. to about 800 degrees C., from about 400 degrees C. to about 800 degrees C., from about 450 degrees C. to about 800 degrees C., from about 500 degrees C. to about 800 degrees C., from about 550 degrees C. to about 800 degrees C., from about 600 degrees C. to about 800 degrees C., from about 650 degrees C. to about 800 degrees C., or from about 700 degrees C. to about 800 degrees C. A preferable temperature range may be from about 200 degrees C. to about 600 degrees C.

The annealing time may vary from about 0 hours to about 24 hours. More preferably, the annealing time varies from about 1 hours to about 6 hours, from about 1.5 hours to about 6 hours, from about 2.0 hours to about 6 hours, from about 2.5 hours to about 6 hours, from about 3.0 hours to about 6 hours, from about 3.5 hours to about 6 hours, from about 4.0 hours to about 6 hours, from about 4.5 hours to about 6 hours, or from about 5.0 hours to about 6 hours.

Although embodiments of the invention are described herein as relating to lithium extraction from OLO materials, certain embodiments are related more generally to the extraction of alkali metals from ceramic materials by high temperature reaction with an organo-halide, organo-chalcogenide, metal halide, or other activating materials disclosed herein. Certain embodiments disclosed herein can activate battery materials other than OLO materials and can be used to extract alkali ions, such as lithium, from the active materials of primary batteries.

In certain embodiments, metal halides are used to pre-activate (or chemically activate prior to any electrochemical activation in the assembled cell) lithium rich layered oxides. For example, lithium rich layered oxides can be pre-activated by direct reaction with metal fluorides such as $AlF_3$, $MgF_2$, $BF_3$, $CaF_2$, $CoF_2$, $TiF_3$, $MnF_2$, $NiF_2$, and combinations thereof.

Cathode materials based on lithium rich layered oxides are prepared by a co-precipitation method disclosed herein and then annealed with metal halides such as $BF_3$ or $TiF_3$ to pre-activate the material. This process results in a layered oxide material that has some amount of lithium extracted prior to assembly of the full cell, and provides a significant improvement in the important battery performance characteristics, such as observed irreversible capacity loss.

Without being bound to any particular theory or mode of action, in certain reactions disclosed herein the fluoride component reacts with the lithium rich layered oxides to form a composition represented as:

$$M_xM'_yX_z \tag{VI}$$

where M and M' are each a metal, X is oxygen or fluorine or a combination of both. For example, in the OLO material $Li[Li_{0.2}Mn_{0.54}Ni_{0.13}Co_{0.13}]O_2$, M=Li; M'=Li, Mn, Ni, Co; X=O. The metal M is preferably an alkali or alkaline-earth metal and M' is a transition metal, a poor metal, a metalloid, an alkali metal, or an alkaline-earth metal.

Further, in certain reactions, the fluorine reacts with the bulk of the lithium rich layered oxide material to form a fluorinated lithium rich layered oxide. That is, some of the oxygen sites are doped with fluorine (or other halide when other halides are used as a precursor). The metal of the metal halide precursor can react with oxygen coming from certain reaction to form a compound represented as:

$$M'O_y. \tag{VII}$$

where M' can be an alkali metal, an alkaline-earth metal, a transition metal, a poor metal, or a metalloid. Still further, the metal of the metal halide precursor could also be doped into the lithium-rich layer oxide.

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Examples

Lithium-Rich Layered Oxides for Secondary Batteries

Half-Cell

Materials and Synthetic Methods. All reactions were prepared in a high purity argon filled glove box (M-Braun, oxygen and humidity contents <0.1 ppm). Unless otherwise specified, materials were obtained from commercial sources (Sigma-Aldrich, Advanced Research Chemicals Inc, Alfa Aesar, etc.) without further purification.

Layered Oxide Activation: An organo-halide and lithium-rich layered oxide material were mixed using a milling process. In some instances a low energy mixing process was used. Milling vessels were loaded with the organo-halide precursor (5 wt %), the lithium-rich layered oxide, and optionally a solvent, such as acetone. The vessels were then sealed and milled. After milling, solvents were evaporated from the mixture at 60 degrees C. and the mixture was subsequently annealed in air, for example at from about 350 degrees C. to about 450 degrees C. Reaction products may be optionally removed by rinsing or other methods.

Electrode Formulation. Cathodes based on the activated layered oxide material were prepared using a formulation composition of 85:7.5:7.5 (active material:binder:conductive additive) according to the following formulation method: 198 mg PVdF (Sigma Aldrich) was dissolved in 15 mL NMP (Sigma Aldrich) overnight. 198 mg of conductive additive was added to the solution and allowed to stir for several hours. 150 mg of the activated layered oxide material was then added to 1 mL of this solution and stirred overnight. Films were cast by dropping about 50 μL of slurry onto stainless steel current collectors and drying at 150 degrees C. for about 1 hour. Dried films were allowed to cool, and were then pressed at 1 ton/$cm^2$. Electrodes were further dried at 150 degrees C. under vacuum for 12 hours before being brought into a glove box for battery assembly.

Electrochemical Characterization. All batteries were assembled in a high purity argon filled glove box (M-Braun, $O_2$ and humidity contents <0.1 ppm), unless otherwise specified. Half cells were made using lithium as an anode, Celgard 2400 separator, and 90 μL of 1M LiPF6 in 1:2 EC:EMC electrolyte. Electrodes and cells were electrochemically characterized at 25 degrees C. with a constant current C/10 charge and discharge rate between 4.7 V and 2.5 V. No constant voltage step was included.

Lithium-Rich Layered Oxides for Secondary Batteries (Full-Cell)

Materials and Synthetic Methods. All reactions were prepared in a high purity argon filled glove box (M-Braun, oxygen and humidity contents <0.1 ppm). Unless otherwise specified, materials were obtained from commercial sources (Sigma-Aldrich, Advanced Research Chemicals Inc, Alfa Aesar, etc.) without further purification.

Layered Oxide Activation. An organo-halide and OLO material were mixed using a milling process. Milling vessels were loaded with the organo-halide precursor (5 wt %), the OLO, and optionally a solvent, such as acetone. The vessels were then sealed and milled. After milling, solvents were evaporated from the mixture at 60 degrees C. and the mixture was subsequently annealed in air at 450 degrees C. Reaction products may be optionally removed by rinsing or other methods.

Electrode Formulation. Cathodes based on the activated layered oxide material were prepared using a formulation composition of 85:7.5:7.5 (active material:binder:conductive additive) according to the following formulation method: 198 mg PVdF (Sigma Aldrich) was dissolved in 15 mL NMP (Sigma Aldrich) overnight. 198 mg of conductive additive was added to the solution and allowed to stir for several hours. 150 mg of the activated layered oxide material was then added to 1 mL of this solution and stirred overnight. Films were cast by dropping about 66 μL of slurry onto stainless steel current collectors and drying at 150 degrees C. for about 1 hour. Dried films were allowed to cool, and were then pressed at 1 ton/$cm^2$. Electrodes were further dried at 150 degrees C. under vacuum for 12 hours before being brought into a glove box for battery assembly.

Anodes based on MCMB (mesoporous carbon micro beads) were prepared using a formulation composition of 85:7:8 (active material:binder:conductive additive) according to the following formulation method: 132 mg PVdF (Sigma Aldrich), 115 mg of conductive additive, and 1400 mg of MCMB were dissolved in 10 mL NMP (Sigma Aldrich) overnight. Films were cast by dropping about 50 μL of slurry onto stainless steel current collectors and drying at 150 degrees C. for about 1 hour. Dried films were allowed to cool, and were then pressed at 1 ton/$cm^2$. Electrodes were further dried at 150 degrees C. under vacuum for 12 hours before being brought into a glove box for battery assembly.

Electrochemical Characterization. All batteries were assembled in a high purity argon filled glove box (M-Braun, $O_2$ and humidity contents <0.1 ppm), unless otherwise specified. Full cells were made using MCMB as an anode, Celgard 2400 separator, and 90 μL of 1M LiPF6 in 1:1 EC:EMC electrolyte. Electrodes and cells were electrochemically characterized at 30 degrees C. with a constant current C/20 charge and discharge rate between 4.6V and 2.0V.

Delithiated Lithium Nickel Oxide for Primary Batteries

Materials and Synthetic Methods. All reactions were prepared in a high purity argon filled glove box (M-Braun, O2 and humidity contents <0.1 ppm). Unless otherwise specified, materials were obtained from commercial sources (Duracell) without further purification.

Lithium Nickel Oxide Delithiation. The organo-halide and lithium nickel oxide material were mixed using a low energy mixing process. Mixing vessels were loaded with the organo-halide precursor (70 molar ration) and the lithium nickel oxide. The mixture was then annealed at about 450 degrees C. for about 6 hours in an inert atmosphere.

Electrode Formulation. Cathodes based on the lithium nickel oxide material were prepared using a formulation composition of 79:21 (delithiated materials:carbon) according to the following formulation method: 1 g of delithiated materials was mixed with 267 mg of carbon followed by adding 66.7 μL of KOH (9M). 450 mg of well-mixed materials were transferred into a cathode can and pressed by hand. 2.4 g of Zn slurry was added to the anode can and enclosed by insulator ring. The separator was wetted using KOH (9M) and placed into the cathode can with cellophane tape facing the cathode film. The cathode can and the anode can were crimped together by hand.

Electrochemical Characterization. Batteries were assembled in air. Electrodes and cells were electrochemically characterized at 25 degrees C. with a constant current C/40 discharge rate between about 2.5V and about 0.2V. No constant voltage step was included.

Lithium-Rich Layered Oxides Activated with Metal Fluorides

Materials and Synthetic Methods. All reactions were performed in air. Unless otherwise specified, materials were obtained from commercial sources (for example, Sigma-Aldrich or Fisher Scientific) without further purification.

Synthesis of Lithium Rich Layered Oxide Material. Lithium rich layered oxide materials were prepared via a co-precipitation process. Metal nitrates were used as precursors for the Li, Mn, Ni, and Co components of the lithium rich layered oxide material. The as-received precursors were dissolved in de-ionized water. The resulting metal nitrate solutions were mixed together in stoichiometric ratios for the target composition. $NH_4HCO_3$ solution was added slowly to the mixed metal nitrate solution as the co-precipitant. After mixing for 0.5 hours, the solutions were dried overnight at 60 degrees Celsius. The dried material was then heated to 200 degrees Celsius and held for 3 hours. Then, the material was annealed for 10 hours at 900 degrees Celsius. All drying, heating, and annealing steps were performed in air.

Layered Oxide Activation by Direct Reaction with Metal Fluorides. Commercially available metal fluorides (for example, $BF_3 \cdot 2H_2O$ or $TiF_3$ from Sigma-Aldrich) were used as precursors. 5 mL of deionized water was added to a crucible containing 500 mg of as-synthesized lithium-rich material from the above synthesis step. A selected amount of $BF_3 \cdot 2H_2O$ was added to the crucible. The resulting contents of the crucible were mixed for 0.5 hours and then dried overnight at 60 degrees Celsius. The dried material was annealed at 400 degrees Celsius for 6 hours. The annealing step can take place in air or nitrogen.

Layered Oxide Activation with Metal Nitrates and Ammonium Fluoride. In some cases, commercially available metal nitrates and an $NH_4F$ solution were used as the metal and fluorine sources for the reaction, respectively. Crucibles loaded with the designated amount of metal fluoride precursors, lithium rich layered oxide, and deionized water were mixed for 0.5 hours. The solutions were dried and subsequently annealed under air. These materials provide comparative examples for testing against embodiments of the invention.

Electrode Formulation. Cathodes based on the activated layered oxide material were prepared using a formulation composition of 80:10:10 of active material:binder:conductive additive. Specifically, 198 mg of binder (poly(vinylidene fluoride) from Sigma-Aldrich) was dissolved overnight in 11 mL of solvent (N-Methyl-2-pyrrolidone from Sigma-Aldrich). 198 mg of conductive carbon SuperLi was added to the solution and allowed to stir for several hours. 144 mg of the activated layered oxide material was then added to 1 mL of this solution (to yield the desired 80:10:10 ratio) and stirred overnight. Films were cast by dropping approximately 50 μL of this slurry onto stainless steel current collectors, which were then dried at 150 degrees Celsius for about 1 hour. The dried films were allowed to cool and the pressed at 1 ton/cm². The pressed electrode films were further dried at 150 degrees Celsius under vacuum for 12 hours.

Electrochemical Characterization. All batteries were assembled in a high purity argon filled glove box (M-Braun, $O_2$ and humidity contents less than 0.1 ppm), unless otherwise specified. Cells were made using lithium as an anode, Celgard 2400 separator, and an electrolyte formulation of 90 μL of 1M $LiPF_6$ in an organic solvent 1:2 mixture of ethylene carbonate (EC):ethyl methyl carbonate (EMC). Electrodes and cells were electrochemically characterized at 30 degrees Celsius with a constant current charge and discharge rate of C/10 (25 mA/g) between 4.8 V and 2.0 V. No constant voltage step was included in the characterization cycles.

Results

FIG. 1 is a voltage trace illustrating the irreversible capacity loss after the first cycle in a conventional OLO material. The coulombic efficiency (labeled "CE" in the graph) of this conventional, unmodified material was measured to be 78%. There was a 71 mAh/g irreversible capacity loss in the first charge-discharge cycle. FIG. 1 demonstrates the irreversible capacity loss in prior art OLO materials.

Figure 2:
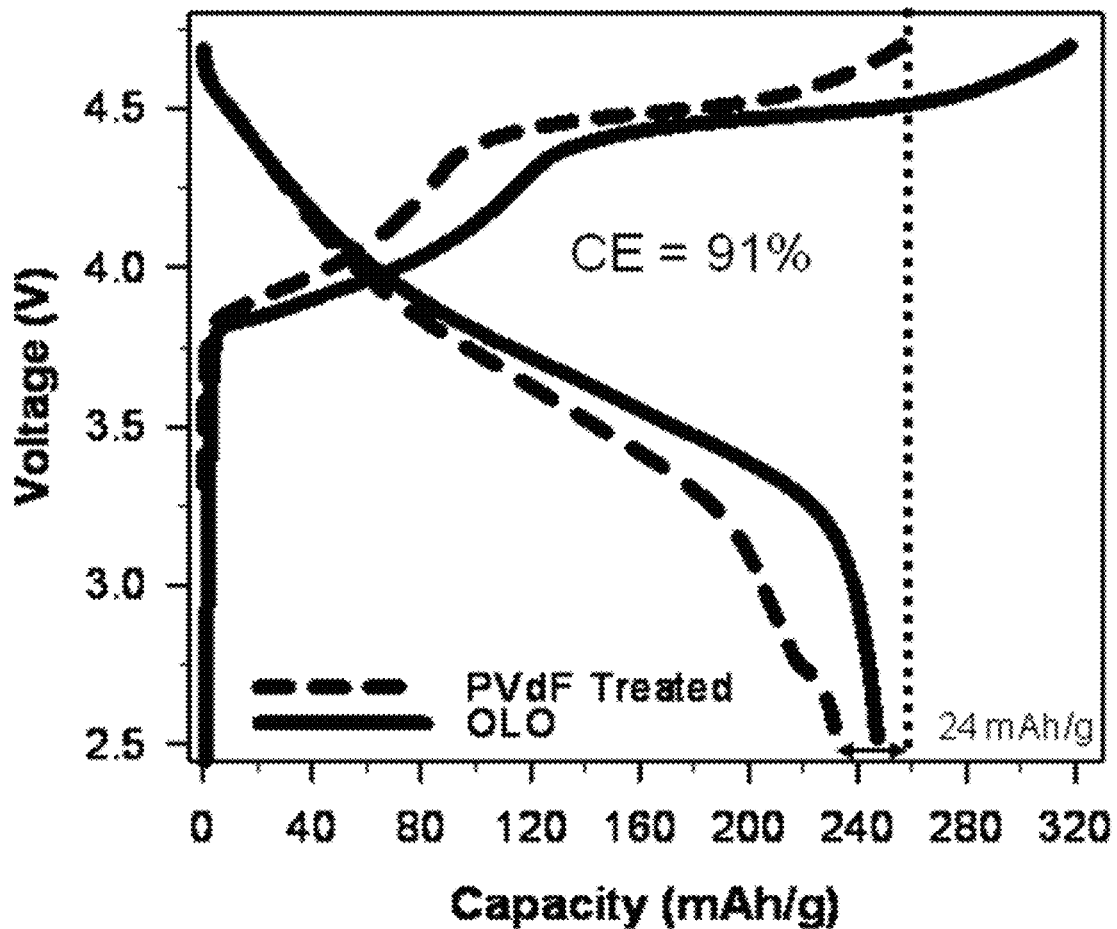
FIG. 2 illustrates voltage traces comparing a conventional OLO material to a material according to an embodiment of the invention and depicts an improvement in irreversible capacity loss after the first cycle.

FIG. 2 is a voltage trace illustrating an improvement in irreversible capacity loss using compounds and methods according to embodiments of the invention as compared to conventional materials. An OLO material was chemically delitiathed using PVdF as the "AB" material (an organofluoride) in the process described above. FIG. 2 demonstrates an improvement in irreversible capacity loss—24 mAh/g for the chemically delithiated material (labeled "PVdF treated") versus 71 mAh/g for the conventional material. The coulombic efficiency of the chemically delithiated material was measured to be 91%.

Figure 3:
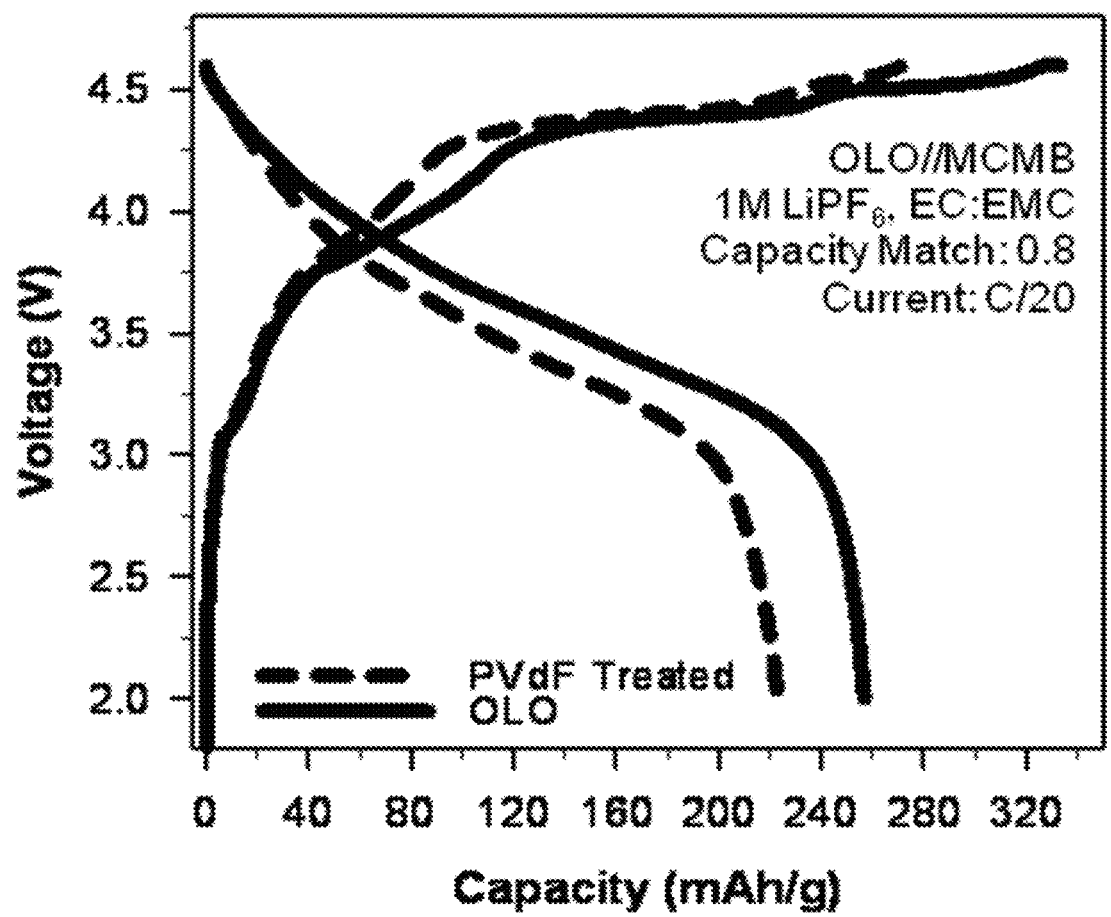
FIG. 3 illustrates voltage traces comparing a conventional OLO material to a material according to an embodiment of the invention and depicts an improvement in irreversible capacity loss after the first cycle in a full cell with a carbon anode.

FIG. 3 is a voltage trace illustrating an improvement in irreversible capacity loss using compounds and methods according to embodiments of the invention as compared to conventional materials. The chemically delitiathed material shows an improved irreversible capacity loss. The materials were measured in a full cell using a carbon anode. The irreversible capacity loss improved from 76 mAh/g for the conventional OLO material to 49 mAh/g for the OLO material chemically delithiated with PVdF. The coulombic efficiency improved from 77.2% for the conventional OLO material to 82.0% for the OLO material chemically delithiated with PVdF.

Figure 4:
FIG. 4 is a table of data illustrating improved performance attributable to compounds and methods according to embodiments of the invention as compared to conventional materials in a full cell with a carbon anode.

FIG. 4 is a table of data illustrating improved performance attributable to compounds and methods according to embodiments of the invention as compared to conventional materials in a full cell with a carbon anode. The top row compares the actual irreversible capacity loss on the first cycle for conventional OLO materials and an OLO material chemically delithiated with PVdF. The OLO material has an irreversible capacity loss between about 80 mAh/g and about 75 mAh/g while the chemically delithiated material has an irreversible capacity loss of about 55 mAh/g. The middle row compares the percent irreversible capacity loss on the first cycle for conventional OLO materials and an OLO material chemically delithiated with PVdF. The OLO material has an irreversible capacity loss between about 31% and about 29% while the chemically delithiated material has an irreversible capacity loss between about 25% and about 24%. The bottom row compares the coulombic efficiency for conventional OLO materials and an OLO material chemically delithiated with PVdF. The OLO material has a coulombic efficiency around about 77% while the chemically delithiated material has a coulombic efficiency around about 81%.

Figure 5:
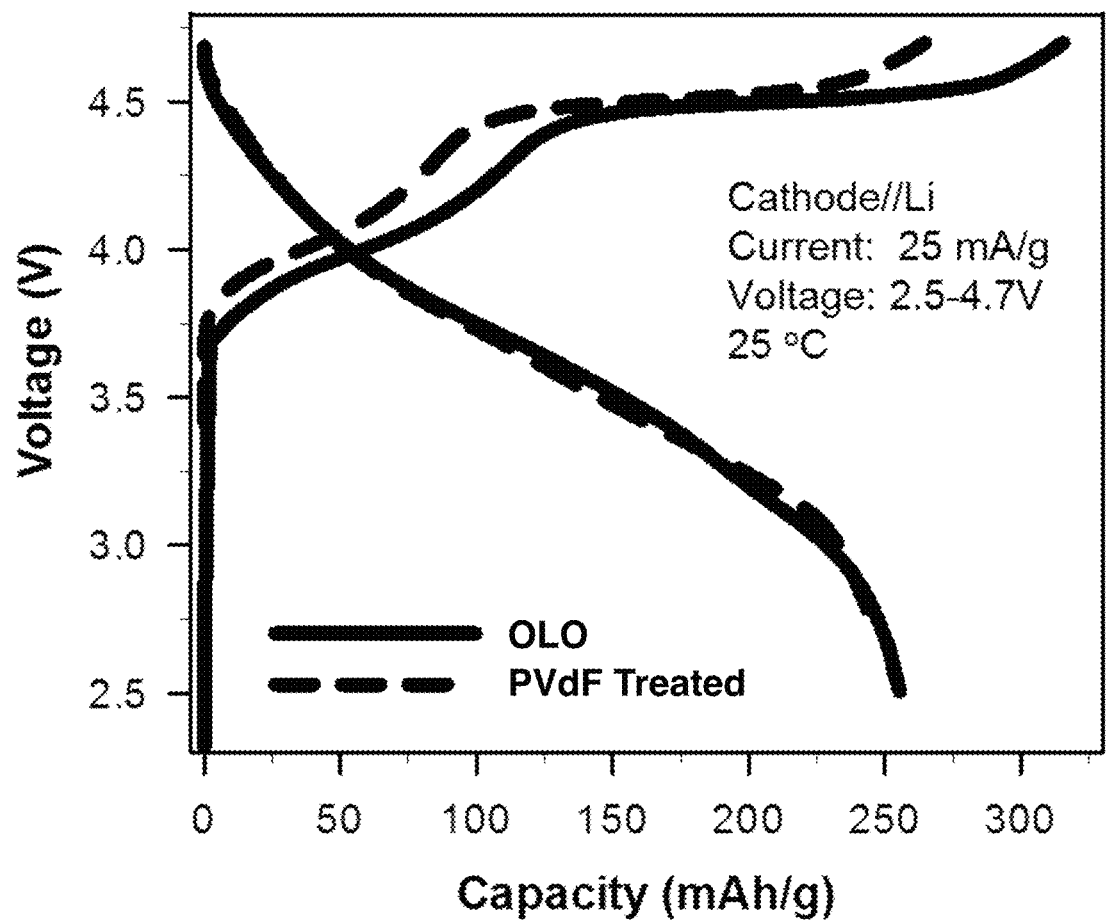
FIG. 5 illustrates voltage traces comparing a conventional OLO material to a material according to an embodiment of the invention and depicts an improvement in irreversible capacity loss after the first cycle.

FIG. 5 is a voltage trace comparison for conventional lithium-rich materials and materials chemically delithiated using PVdF. FIG. 5 demonstrates that the irreversible capacity has been reduced from 18.7% to 3.9% by chemically delithiating the OLO material without any decrease in specific capacity. Further, FIG. 5 shows that coulombic efficiency on first charge increases from 81.3% to 96.1% for the chemically delithiated material.

Figure 6:
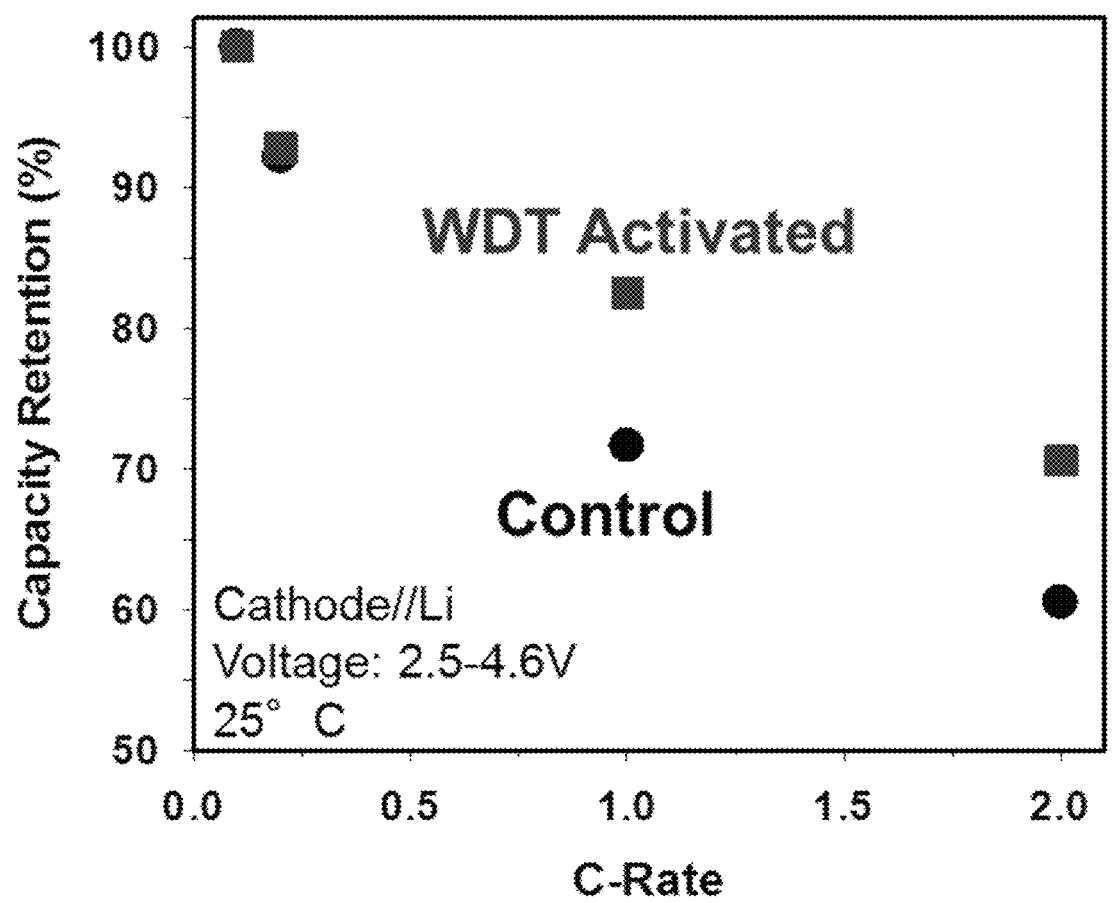
FIG. 6 illustrates a graph comparing a conventional OLO material to a material according to an embodiment of the invention and depicts rate performance improvements.

FIG. 6 is a rate performance comparison between a conventional OLO material that has been chemically delithiated (circles) and one that has not been chemically delithiated (squares). The OLO material activated (that is, chemically delithiated) according to embodiments disclosed herein demonstrated improved rate performance. In some cases the chemical activation process improves the rate performance for the OLO material from 64.5% to 76.1%.

Figures 7A, 7B, 7C:
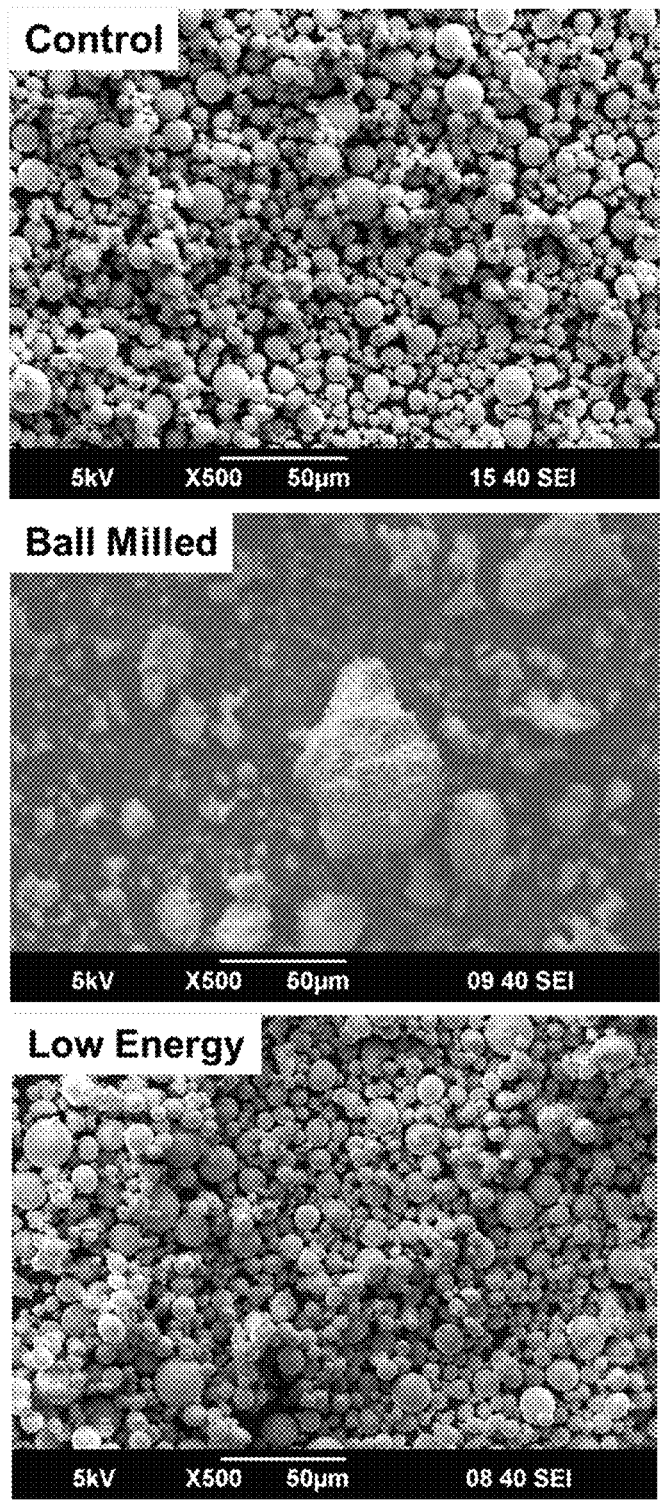
FIGS. 7A, 7B, and 7C are each scanning electron micrographs depicting the morphology of a conventional material (FIG. 7A), a milled material (FIG. 7B), and a material mixed using a low-energy process (FIG. 7C). The low-energy process substantially preserves the original morphology.

FIGS. 7A, 7B, and 7C are each scanning electron microscopy images of various materials according to embodiments of the invention. FIG. 7A is an image of an unprocessed, as-received OLO material. FIG. 7B is an image of the OLO material processed using a ball-milling mixing process. FIG. 7C is an image of the OLO material processed using a lower energy mixing process and FIG. 7C demonstrates that the low energy mixing process preserves the initial morphology. Importantly, the performance improvements shown in FIGS. 5 and 6 are accomplished without modifying the original particle morphology (FIG. 7A), as shown in FIG. 7C. Using a low energy mixing process, the as-received particle morphology is maintained while still improving irreversible capacity and rate performance.

Figure 8:
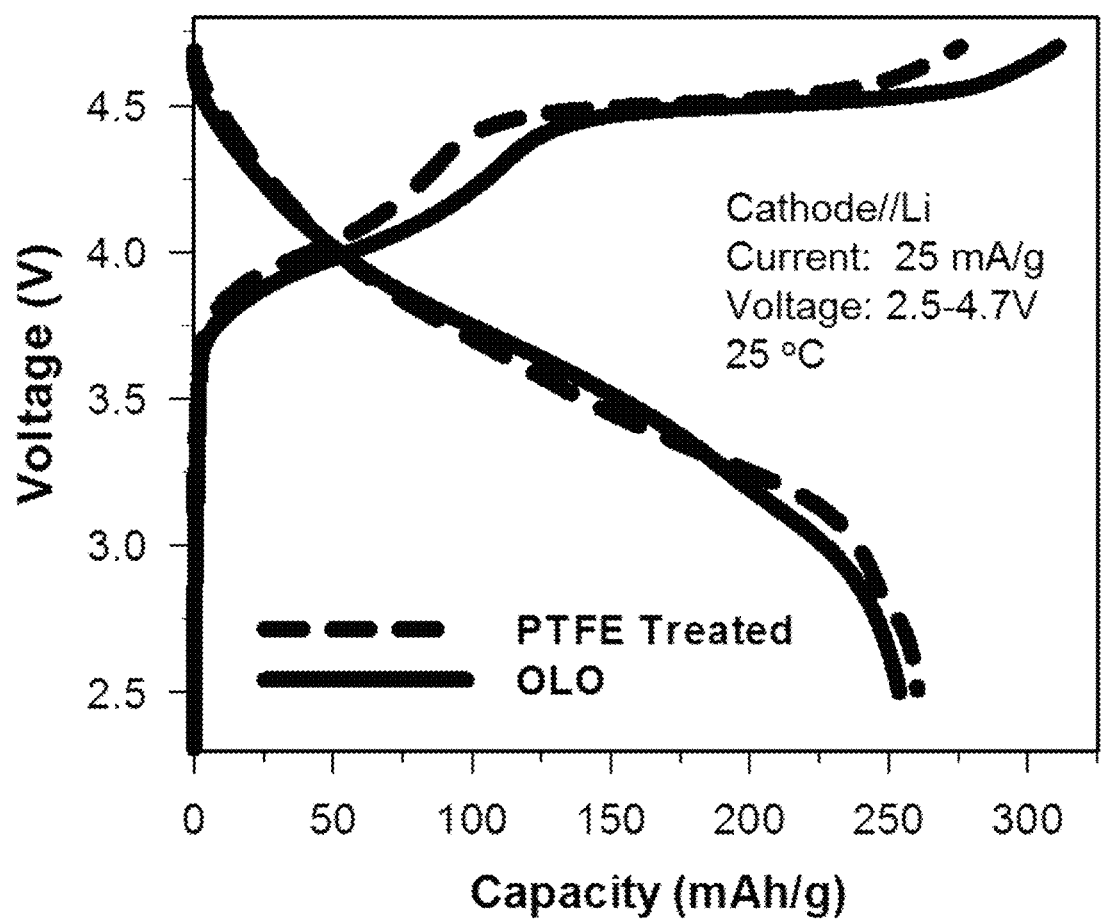
FIG. 8 illustrates voltage traces comparing a conventional OLO material to a material according to an embodiment of the invention and depicts an improvement in irreversible capacity loss after the first cycle.

FIG. 8 is a voltage trace comparison between a conventional OLO material (solid line) and the same material that has been chemically delithiated using PTFE (dashed line). FIG. 8 demonstrates that the irreversible capacity has been reduced from 18.7% to 5.5% while also maintaining similar specific capacity between the materials.

Table 1 provides a summary of data for a conventional OLO compared to the same material that has been chemically delithiated using PVdF. Table 1 shows that capacity, coulombic efficiency, rate performance, and cycle life are similar or better for the chemically delithiated material.

TABLE 1

Cathode performance data with and without activation by an organo-halide

| Metric | Activated | Control |
| --- | --- | --- |
| Specific Capacity at Cycle 1 (mAh/g) | 254 | 260 |
| Coulombic Efficiency at Cycle 1 (%) | 96.1 | 81.3 |
| Rate Performance (2 C/0.2 C) | 76.1 | 64.5 |
| Cycle Life 25th cycle/5th cycle (%) | 93.0 | 91.4 |

Figure 9:
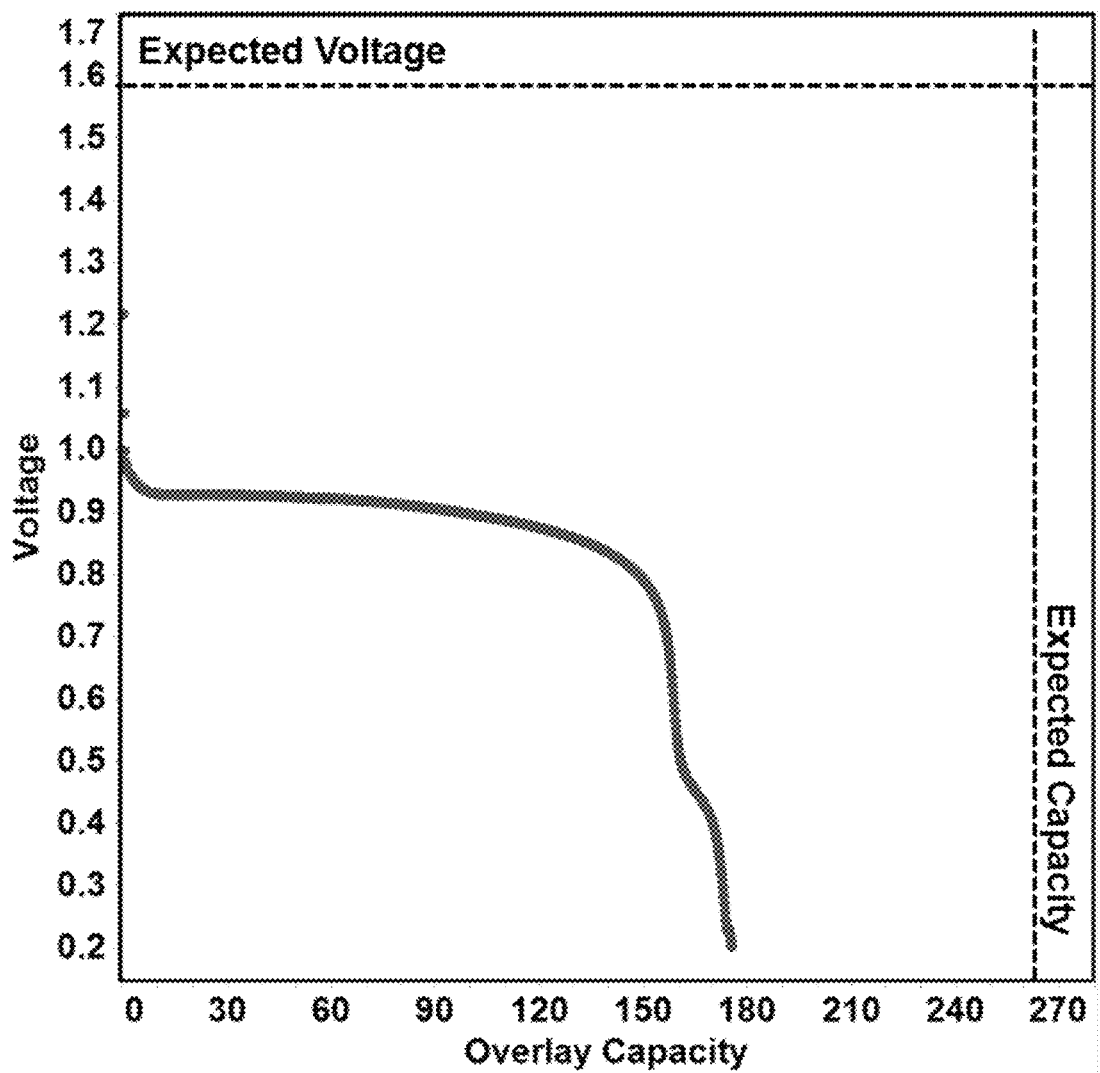
FIG. 9 illustrates a voltage trace for a primary battery in which the cathode material was delithiated according to an embodiment of the invention.

FIG. 9 is a voltage trace for a primary battery cell with a $LiNiO_2$ cathode material delithiated using PVdF. FIG. 9 demonstrates an extraction efficiency of approximately 70% for a solid state lithium extraction process using PVdF. From these results, it is understood that a ratio of PVdF to the nickel oxide starting material in excess of 100% is required to fully delithiate $LiNiO_2$.

Figure 10A:
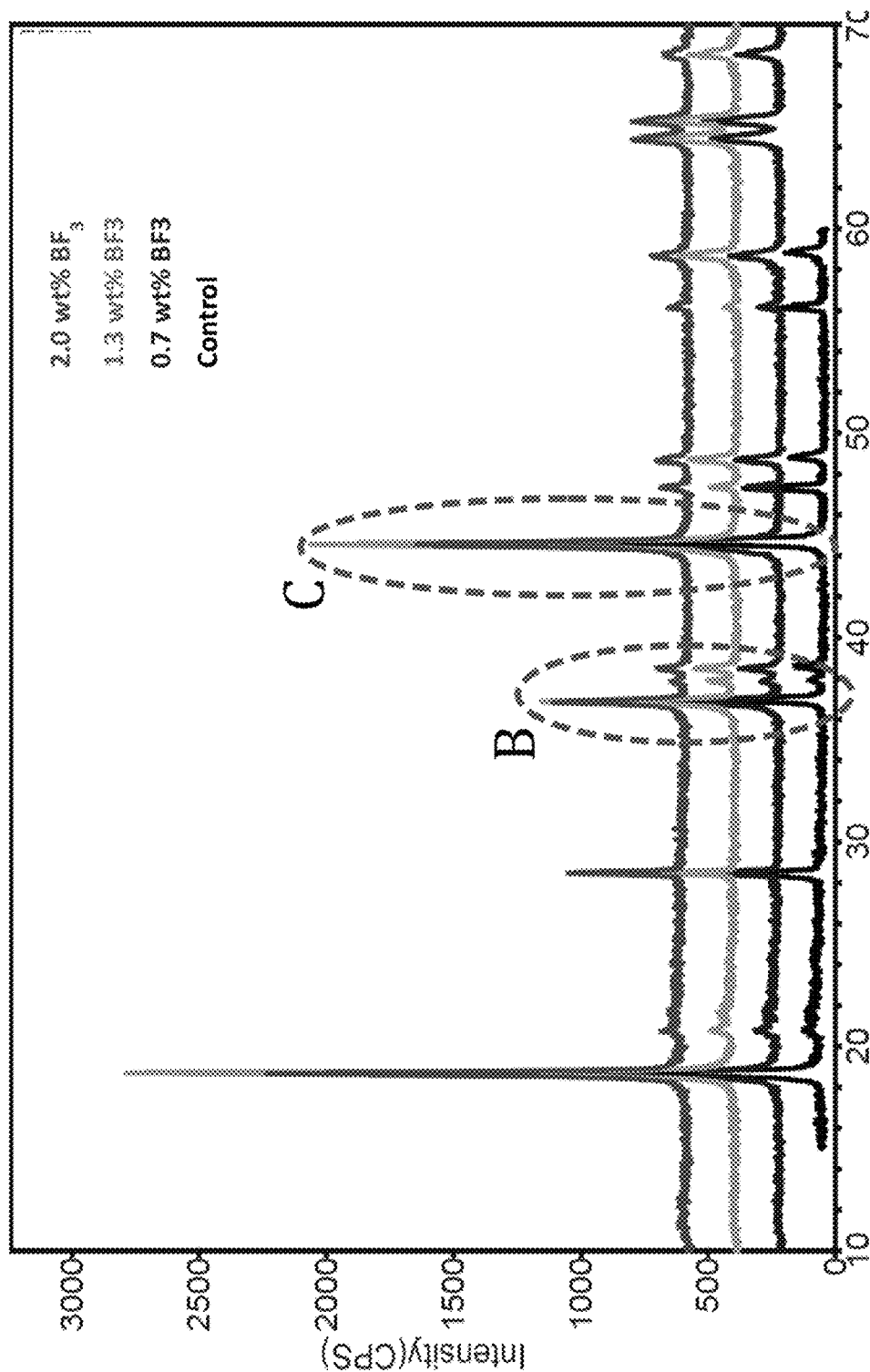
FIGS. 10A, 10B, 10C, and 10D illustrate x-ray diffraction patterns for a conventional lithium rich NMC material and the lithium rich NMC material pre-activated according to embodiments of the invention.
Figure 10B:
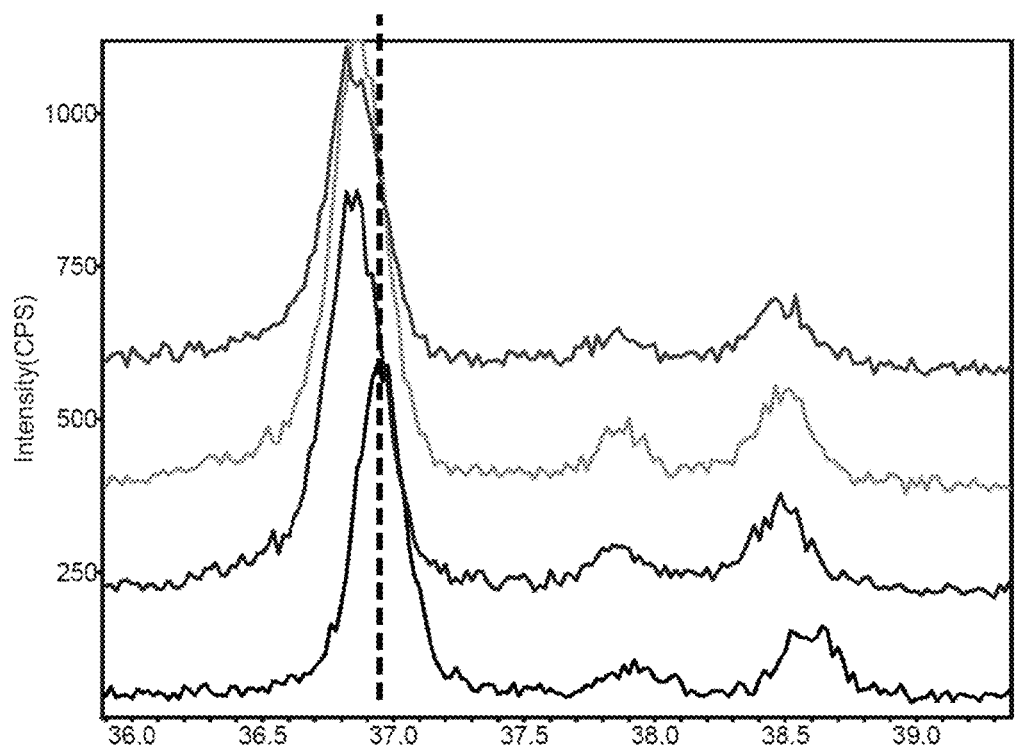
Figure 10C:
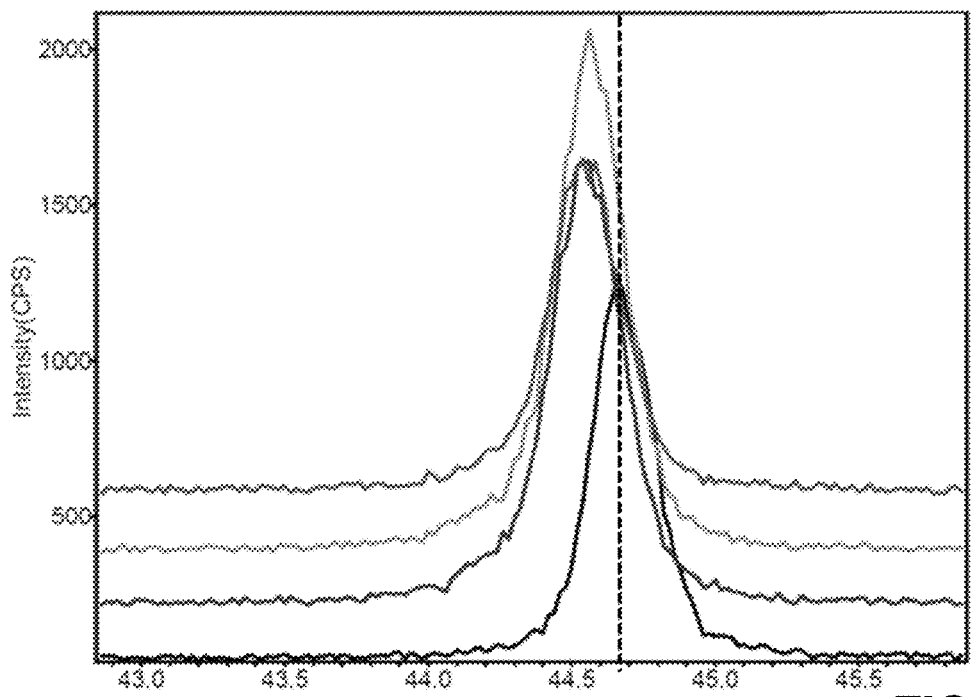
Figure 10D:
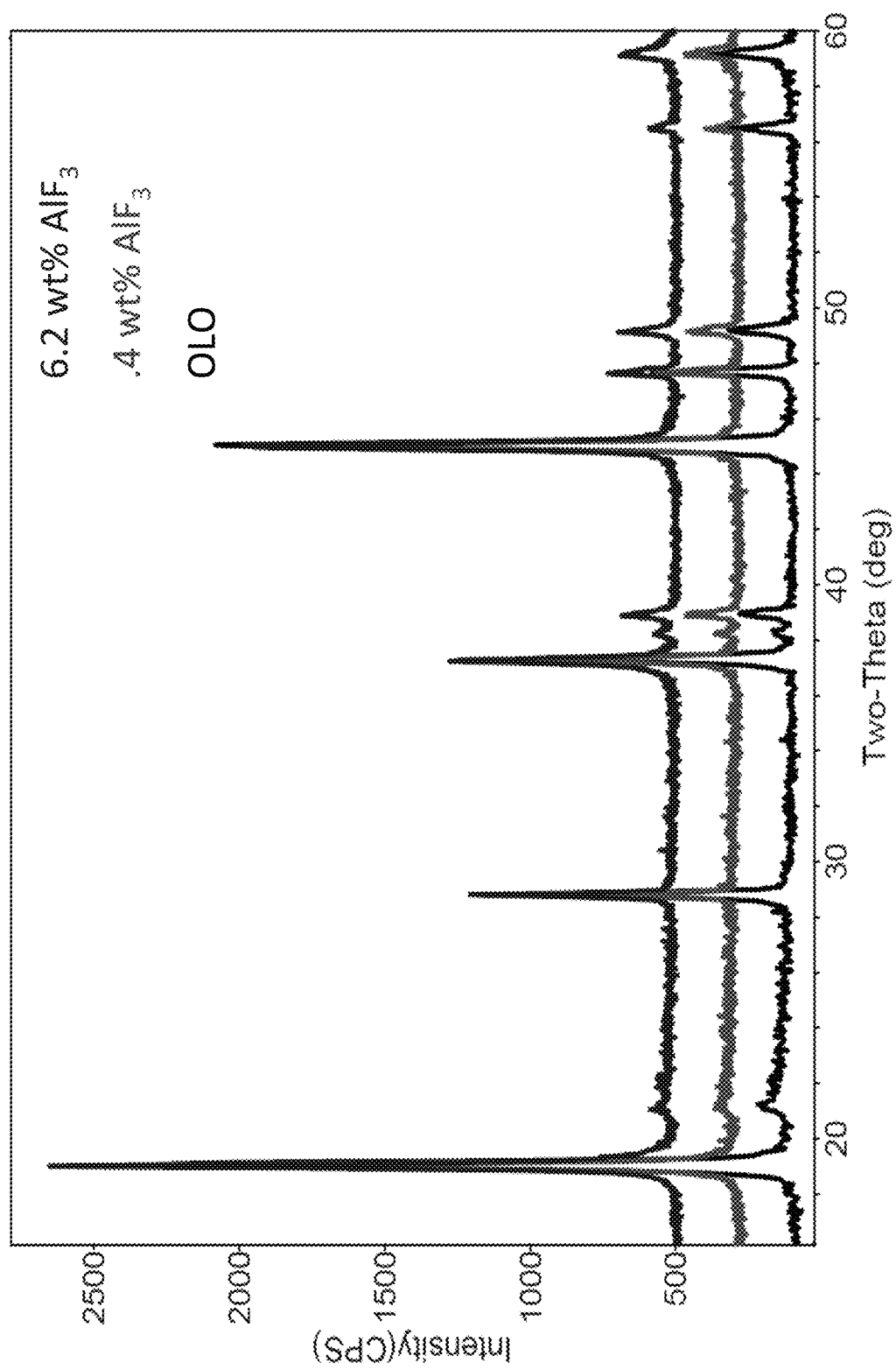

FIGS. 10A, 10B, and 10C illustrate x-ray diffraction patterns for a control lithium rich NMC material as compared to lithium rich NMC materials reacted with different amounts of a metal fluoride (in this case, $BF_3$). FIG. 10A depicts the full range of the diffraction patterns, while FIGS. 10B and 10C depict the peaks in the diffraction patterns circled and labeled as "B" and "C," respectively. The amount of $BF_3$ reacted varied was 0.7 weight percent, 1.3 weight percent, or 2 weight percent. FIG. 10A demonstrates that the lithium rich NMC material was the major phase in all the tested samples. However, the major diffraction peaks around 37 degrees 2θ and 44 degrees 2θ systematically shift to a lower 2θ angle with increasing concentration of $BF_3$. Although not depicted in FIG. 10A, 10B, or 10C, no further shift in these peaks was observed when the $BF_3$ content was increased beyond 2 weight percent. No such shift is observed when $AlF_3$ was used as an activating precursor, as shown in FIG. 10D.

The shift of these peaks to lower 2θ angle demonstrates an increase in one or more lattice parameters of the crystalline phase of the lithium rich NMC material. Lattice expansion is consistent with a mechanism such as doping of a reactant into the lithium rich NMC material. For example, fluorine atoms can be doped into the oxygen sites of the lithium rich NMC material, which would increase at least one lattice parameter.

The data in FIGS. 10A, 10B, and 10C confirms that the metal fluoride materials are reacting with the lithium rich NMC material to produce a reaction product. The reaction product is structurally distinct from unreacted lithium rich NMC. In contrast, when a lithium rich NMC material was coated with a metal fluoride, the x-ray diffraction pattern would show the superposition of the diffraction pattern of the pristine lithium rich NMC material and the diffraction pattern of the metal fluoride. That is, no peaks would be shifted in the lithium rich NMC material, but additional peaks related to the metal fluoride material would appear in the diffraction pattern.

Figure 11:
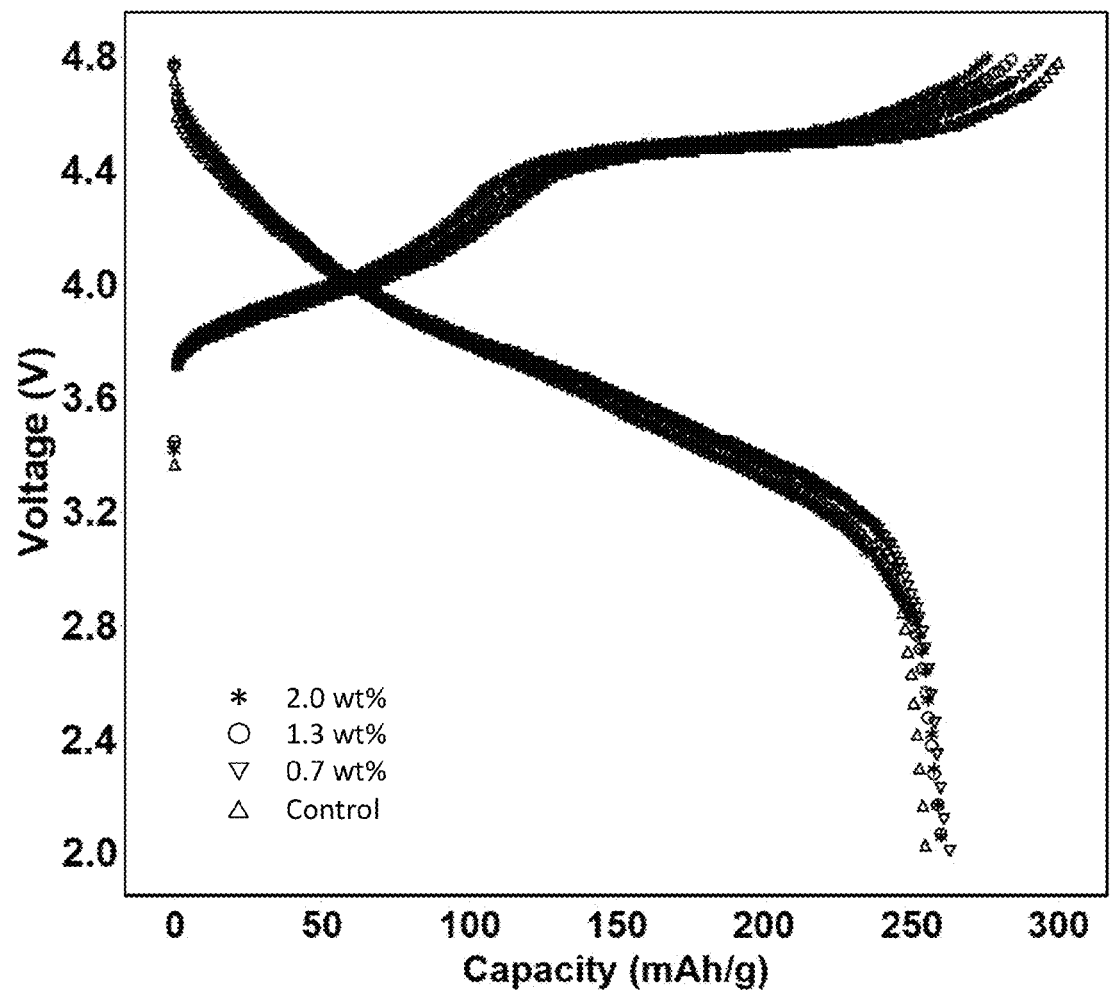
FIG. 11 illustrates voltage traces comparing a conventional lithium rich NMC material to the lithium rich NMC material pre-activated according to embodiments of the invention and depicts an improvement in irreversible capacity loss after the first cycle.

FIG. 11 is a series of voltage traces illustrating an improvement in irreversible capacity loss using compounds and methods according to embodiments of the invention as compared to conventional materials (as-synthesized lithium rich NMC). FIG. 11 illustrates an improvement in irreversible capacity with increasing concentration of $BF_3$. The improved materials were generated by pre-activating as-synthesized lithium rich NMC with various amount of $BF_3$, including 0.7 weight percent, 1.3 weight percent, and 2 weight percent. The irreversible capacity has been reduced from 15.1% in the untreated lithium rich NMC material to 5.5% using the lithium rich NMC material pre-activated with 2 wt % $BF_3$ without any decrease in specific discharge capacity. Further, FIG. 11 illustrates that the coulombic efficiency as measured on the first charge increases from 84.9% in the untreated lithium rich NMC material to 94.5% using the lithium rich NMC material pre-activated with 2 wt % $BF_3$.

Table 2 provides a summary of data for a conventional lithium rich NMC material compared to that material that has been pre-activated using a metal halide (in this case $BF_3$). Table 2 shows improvement in the irreversible capacity and the coulombic efficiency of electrodes formed by pre-activation with a metal fluoride. Notably, the discharge capacity remained essential constant while the irreversible capacity and the coulombic efficiency improved. To generate the data in Table 2, the cells were cycled between 4.8 V and 2.0 V at a rate of C/10 and at a temperature of 30 degrees Celsius.

TABLE 2

Cathode performance data with and without activation by a metal halide

| Metal Fluoride Precursor (weight %) | Charge Capacity (mAh/g) | Discharge Capacity (mAh/g) | Irreversible Capacity Loss (mAh/g) | Coulombic Efficiency (%) |
| --- | --- | --- | --- | --- |
| 0.0 (Control) | 300.1 | 255.2 | 44.9 | 85.0 |
| 0.7 | 293.8 | 262.5 | 31.3 | 89.3 |
| 1.3 | 284.4 | 260.5 | 23.9 | 91.6 |
| 2.0 | 276.1 | 260.5 | 15.6 | 94.3 |

Figure 12:
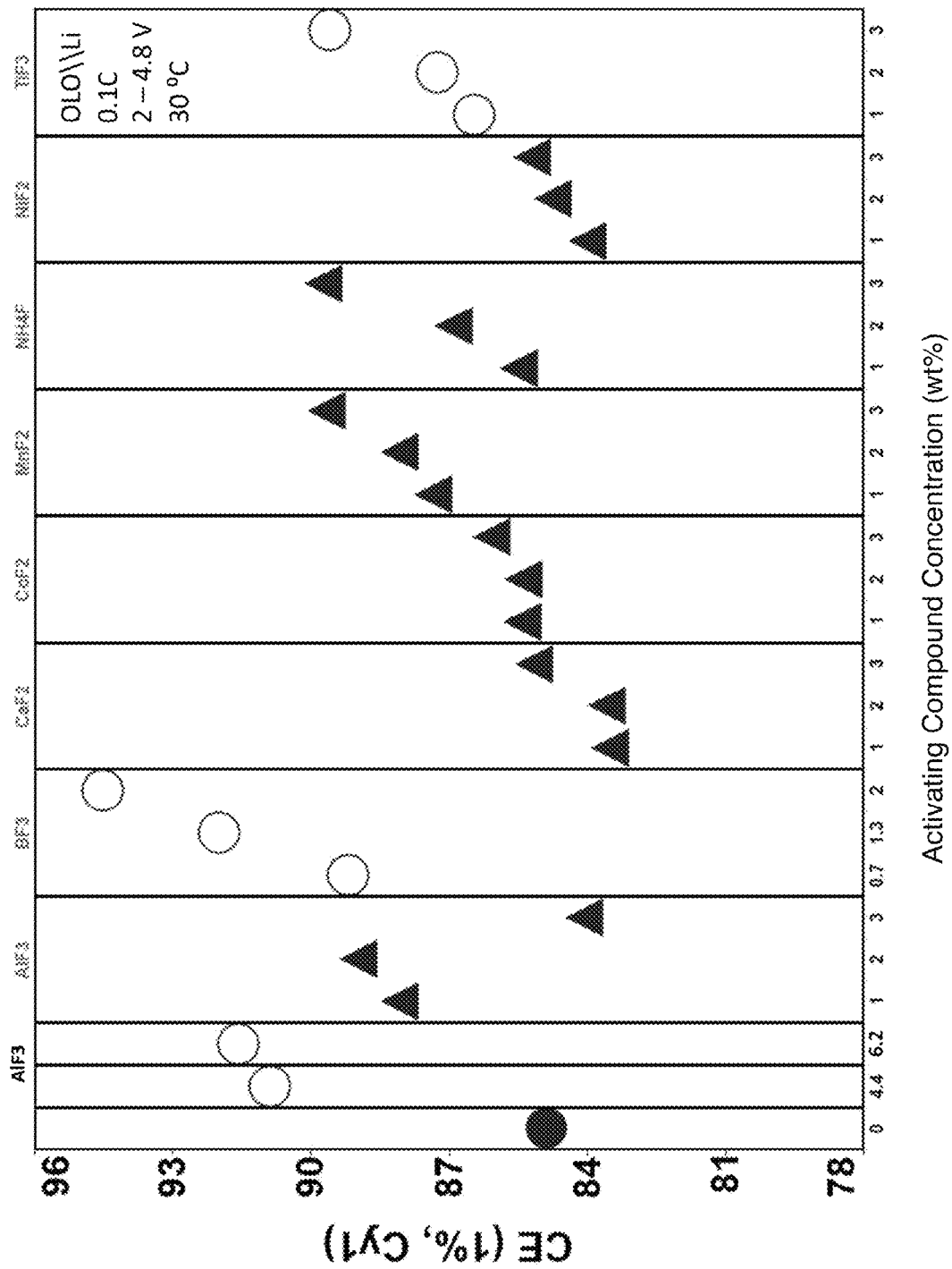
FIG. 12 graphically depicts first cycle coulombic efficiency for a conventional lithium rich NMC material and for the lithium rich NMC material pre-activated according to embodiments of the invention.

FIG. 12 illustrates the first cycle coulombic efficiency for electrode materials in cells cycled between 4.8 V and 2.0 V at a rate of 0.1 C and at a temperature of 30 degrees Celsius. The left-most column shows the data (represented with a solid circle) for the control material (as-synthesized lithium rich NMC material). The open circles represent data collected for electrode materials pre-activated by direct reaction a metal fluoride according to embodiments described herein. Specifically, the open circles correspond to pre-activation of as-synthesized lithium rich NMC using $AlF_3$ (concentrations of 4.4 weight percent and 6.2 weight percent), $BF_3$ (concentrations of 0.7 weight percent, 1.3 weight percent, and 2 weight percent) and $TiF_3$ (concentrations of 1 weight percent, 2 weight percent, and 3 weight percent). Each of the pre-activation materials, $AlF_3$, $BF_3$, and $TiF_3$ demonstrate a concentration dependent increase in coulombic efficiency. FIG. 12 shows data from additional examples in which certain metal nitrates and $NH_4F$ solution were used as the precursors.

Figure 13:
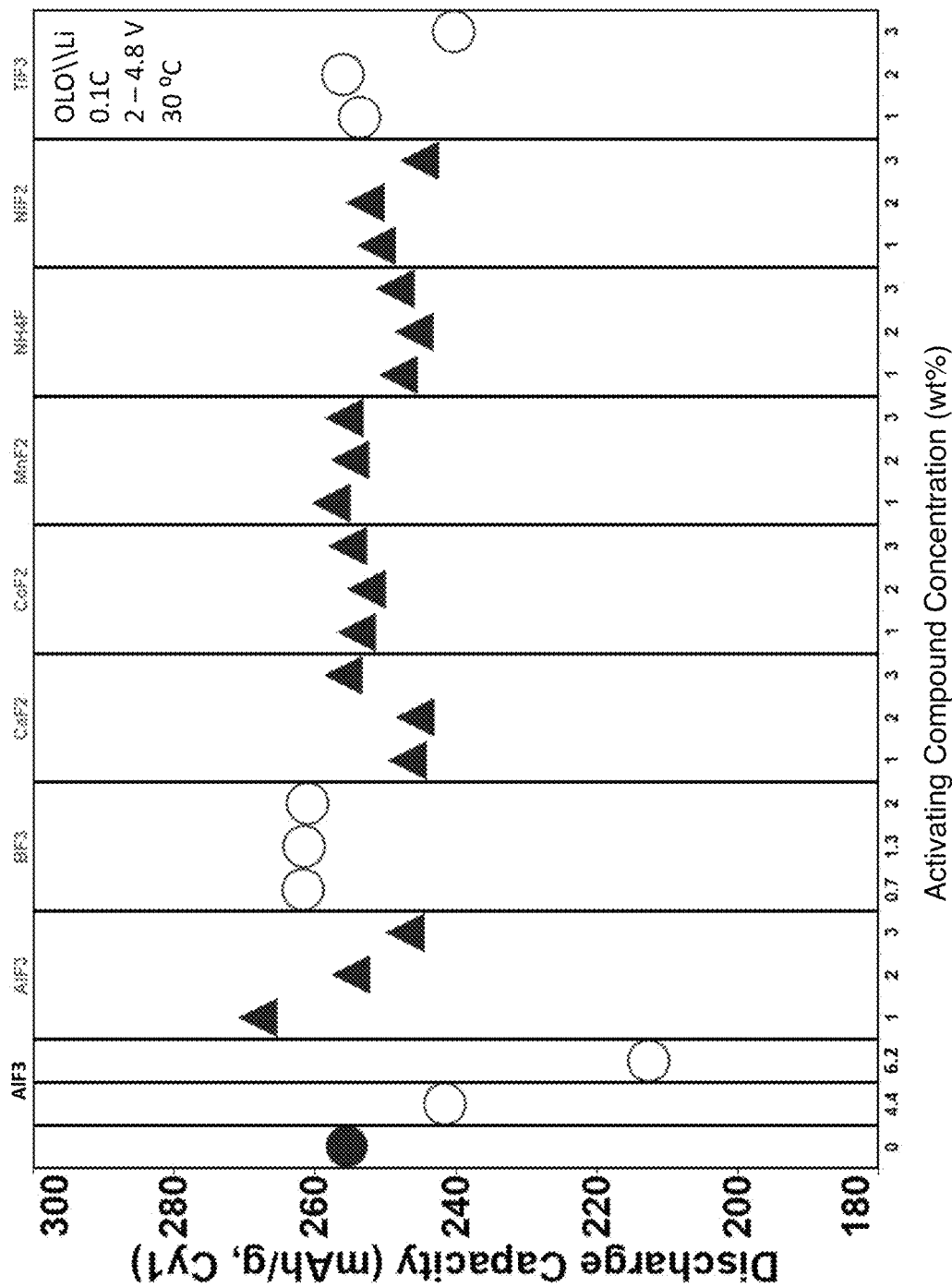
FIG. 13 graphically depicts first cycle discharge capacity for a conventional lithium rich NMC material and for the lithium rich NMC material pre-activated according to embodiments of the invention.

FIG. 13 illustrates the first cycle discharge capacity for electrode materials in cells cycled between 4.8 V and 2.0 V at a rate of 0.1 C and at a temperature of 30 degrees Celsius. The left-most column shows the data (represented with a solid circle) for the control material (as-synthesized lithium rich NMC material). The open circles represent data collected for electrode materials pre-activated by direct reaction a metal fluoride according to embodiments described herein. Specifically, the open circles correspond to pre-activation of as-synthesized lithium rich NMC using $AlF_3$ (concentrations of 4.4 weight percent and 6.2 weight percent), $BF_3$ (concentrations of 0.7 weight percent, 1.3 weight percent, and 2 weight percent) and $TiF_3$ (concentrations of 1 weight percent, 2 weight percent, and 3 weight percent). FIG. 13 demonstrates comparable discharge capacity across several examples of pre-activation. As with FIG. 12, the triangles indicate the use of metal nitrates and $NH_4F$ solution as the precursors.

Figure 14:
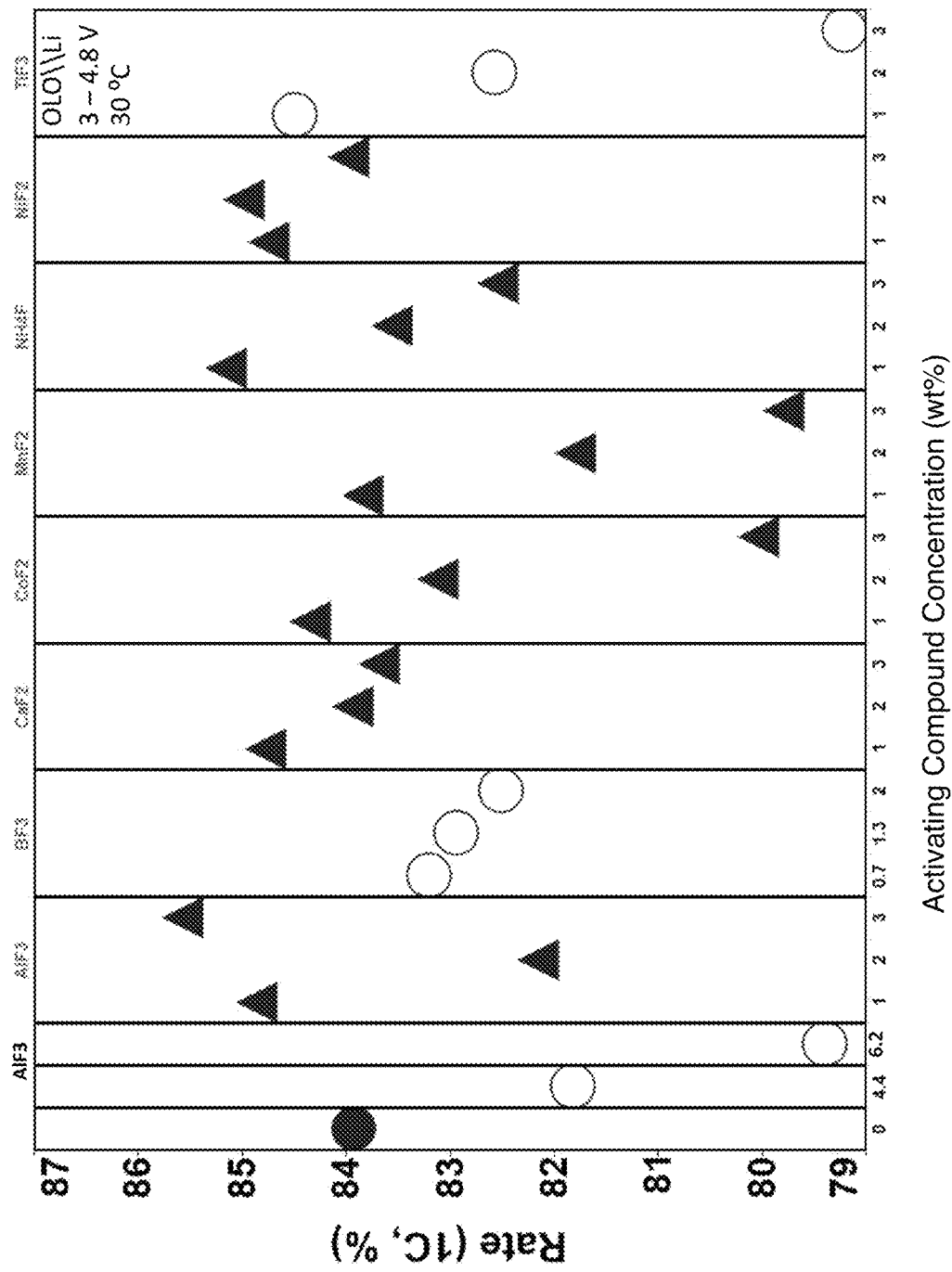
FIG. 14 graphically depicts rate capability for a conventional lithium rich NMC material and for the lithium rich NMC material pre-activated according to embodiments of the invention.

FIG. 14 illustrates the rate capability (the percentage of 0.1 C rate capacity retained at discharge at a 1 C rate) for electrode materials in cells cycled between 4.8 V and 3.0 V at a temperature of 30 degrees Celsius. The left-most column shows the data (represented with a solid circle) for the control material (as-synthesized lithium rich NMC material). The open circles represent data collected for electrode materials pre-activated by direct reaction a metal fluoride according to embodiments described herein. Specifically, the open circles correspond to pre-activation of as-synthesized lithium rich NMC using $AlF_3$ (concentrations of 4.4 weight percent and 6.2 weight percent), $BF_3$ (concentrations of 0.7 weight percent, 1.3 weight percent, and 2 weight percent) and $TiF_3$ (concentrations of 1 weight percent, 2 weight percent, and 3 weight percent). FIG. 14 shows the additional examples demonstrating the improvement in the rate capability of lithium-rich NMC material using a chemical activation step with metal fluorides. Both $AlF_3$ and $NH_4F$ showed 1 C capacity retention over 85%.

The improvement in coulombic efficiency may be applicable to other ceramic materials (such as lithium-excess battery cathode materials).

Still further, metal halides based on chlorine can function in a manner similar to metal fluorides but as a lower cost alternative (for example, $AlCl_3$), as described herein with respect to organo-halides. Metal chlorides could be used for extraction of other alkali or alkaline-earth ions, in addition to lithium, from layered oxide materials.

The metal-halide reactions disclosed herein could be used for activation of primary battery materials similar to the uses of organo-halides for primary batteries disclosed herein. For example, removal of alkali metal ions or alkaline earth metal ions via reaction with metal halides can enable a cathode material to be used in a primary battery.

One of the important advantages of the metal-halide reactions disclosed herein is that the reactions can be performed in air. This feature of the reaction provides significant gains in efficiency and scalability over prior art reaction methods.

According to embodiments disclosed herein, conventional OLO materials can be improved using a chemical delithiation process such that the rate performance improves and the irreversible capacity loss at first cycle is less than 5%. These and other performance gains are achieved without diminishing other properties such as specific capacity. Particle morphology can be preserved as well.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A method of forming an active material for a battery electrode, comprising:
    providing a starting material comprising a lithium-rich layered oxide;
    mixing the starting material with an activating material comprising a metal-halide compound; and
    annealing the mixture for a time and temperature such the starting material reacts with the metal-halide compound to form the activated material, wherein the activated material is characterized by an expanded crystalline lattice as compared to the starting material.

2. The method of claim 1 wherein a metal component of the metal-halide is a transition metal, a poor metal, a metalloid, an alkali metal, or an alkaline-earth metal.

3. The method of claim 1 wherein a metal component of the metal-halide is selected from the group consisting of aluminum, boron, calcium, cobalt, manganese, nickel, titanium, and combinations thereof.

4. The method of claim 1 wherein a metal component of the metal-halide is boron.

5. The method of claim 1 wherein a metal component of the metal-halide is titanium.

6. The method of claim 1 wherein the activating material is selected from the group consisting of $AlF_3$, $BF_3$ and $TiF_3$.

7. The method of claim 1 wherein the starting material comprises lithium, manganese, nickel, cobalt, and oxygen.

8. The method of claim 1 wherein the starting material comprises lithium, nickel, and oxygen.

9. A method of making a battery, comprising:
    providing an electrolyte;
    providing an anode;
    providing a cathode comprising a chemically delithiated active material, wherein the active material is chemically delithiated by a reacting a lithium rich starting material with a metal halide, wherein the chemically delithiated active material is characterized by an expanded crystalline lattice as compared to the lithium rich starting material; and
    assembling the electrolyte, anode, and cathode into a battery.

10. The method of claim 9 wherein the active material comprises lithium, at least one transition metal, and oxygen.

11. The method of claim 9 wherein the active material comprises lithium, manganese, nickel, cobalt, and oxygen.

12. The method of claim 9 wherein the active material comprises lithium, nickel, and oxygen.

13. The method of claim 9 wherein the battery is a primary battery.

14. The method of claim 9 wherein the battery is a secondary battery.

15. The method of claim 9 wherein a metal component of the metal-halide is selected from the group consisting of aluminum, boron, calcium, cobalt, manganese, nickel, titanium, and combinations thereof.

16. The method of claim 9 wherein a metal component of the metal-halide is boron, titanium, or combinations thereof.

17. The method of claim 9 wherein a metal halide is selected from the group consisting of $AlF_3$, $BF_3$ and $TiF_3$.

18. A battery comprising the electrode formed by the method of claim 9.

19. The battery of claim 18 wherein the battery is a primary battery.

20. The battery of claim 18 wherein the battery is a secondary battery.

* * * * *